United States Patent [19]
Sawyer et al.

[11] Patent Number: 5,849,255
[45] Date of Patent: Dec. 15, 1998

[54] TREATMENT OF DIESEL EXHAUST GAS USING ZEOLITE CATALYST

[75] Inventors: John E. Sawyer, Union, Ky.; Jack C. Summers, II, Newtown, Pa.

[73] Assignee: ASEC Manufacturing, Tulsa, Okla.

[21] Appl. No.: 659,210

[22] Filed: Jun. 5, 1996

Related U.S. Application Data

[63] Continuation-in-part of Ser. No. 473,661, Jun. 7, 1995, abandoned.

[51] Int. Cl.⁶ .......................................................... B01J 8/02
[52] U.S. Cl. ..................................... 423/213.5; 423/213.2; 423/239.2
[58] Field of Search ............................... 423/239.2, 213.5, 423/213.2

[56]           References Cited

U.S. PATENT DOCUMENTS

| | | |
|---|---|---|
| 5,248,643 | 9/1993 | Patil et al. . |
| 5,462,907 | 10/1995 | Farrauto et al. ........................ 502/304 |
| 5,580,535 | 12/1996 | Hoke et al. .......................... 423/245.3 |
| 5,627,124 | 5/1997 | Farrauto et al. ........................ 502/304 |

FOREIGN PATENT DOCUMENTS

| | | |
|---|---|---|
| 0508513 A1 | 10/1992 | European Pat. Off. . |
| 0584737 A1 | 3/1994 | European Pat. Off. . |
| 0638710 A2 | 2/1995 | European Pat. Off. . |
| 0716877 A1 | 6/1996 | European Pat. Off. . |
| 401926 | 10/1994 | WIPO . |

*Primary Examiner*—Michael L. Lewis
*Assistant Examiner*—Thomas G. Dunn, Jr.
*Attorney, Agent, or Firm*—Kuffner & Associates

[57]           ABSTRACT

A high activity catalyst and the method of using it to effectively convert the hydrocarbon, soluble oil fraction and carbon monoxide in a diesel exhaust stream while minimizing the oxidation of $SO_2$ is disclosed. The catalyst comprises at least one platinum group metal dispersed on a two-component support comprising in major amount one or more zeolites and in minor amount an inorganic oxide selected from the group consisting of alumina, titania and mixtures thereof.

3 Claims, No Drawings

TREATMENT OF DIESEL EXHAUST GAS USING ZEOLITE CATALYST

This application is a continuation-in-part of application Ser. No. 08/473,661, filed Jun. 7, 1995.

BACKGROUND OF THE INVENTION

This invention relates to a method for the catalytic destruction of hydrocarbons, carbon monoxide, and nitrogen oxides in the emissions from diesel vehicles, and to catalysts for use in such method. In particular, this invention relates to high activity catalysts for converting diesel engine exhaust which catalysts also have a reduced tendency to oxidize sulfur in the exhaust.

Diesel engine exhaust contains both hydrocarbons that are vapors or gases at ambient temperatures as well as hydrocarbons that have low vapor pressures at such temperatures and, as a result, condense onto the carbonaceous particulates created in the combustion process (the so-called "Soluble Organic Fraction" or "SOF"). Diesel exhaust also contains high levels of sulfur in the form of sulfur dioxide ($SO_2$). When $SO_2$ oxidizes, it is converted to $SO_3$, which then readily combines with water present in the exhaust to form sulfuric acid. Any sulfuric acid condensation will increase the measured particulate matter load of the exhaust gas and such condensation occurs more readily when hydrocarbons, especially the particulates, are present.

The conversion of $SO_2$ to $SO_3$ occurs readily over most oxidation catalysts, and especially over platinum-based catalysts (the so-called "high activity" catalysts). An alumina-supported high activity catalyst will store sulfur at relatively low temperatures (below 350° C.) and release it at higher temperatures (above 450° C.), at which the catalytically promoted oxidation of $SO_2$ to $SO_3$ is favored. Regulations governing the amounts of hydrocarbon and of particulate matter in diesel exhaust make a reduction in these emissions most desirable. These factors require that the standard platinum-based, alumina-supported diesel catalyst be improved upon.

A disadvantage to the catalysts presently used for converting diesel exhaust is that they have low activity at the lower temperatures that are typical of diesel exhaust. It is, therefore, an object of the present invention to provide a high activity catalyst and a process for effectively converting diesel exhaust to reduce the levels of particulate matter, hydrocarbons, carbon monoxide, and nitrogen oxides, while at the same time allowing for less oxidation of sulfur in the exhaust.

SUMMARY OF THE INVENTION

The present invention provides a catalyst that traps diesel exhaust hydrocarbons during operation at low temperatures typical of diesel exhaust and releases and oxidizes them at higher temperatures. The catalyst of the invention comprises at least one noble metal selected from the group consisting of platinum, palladium, rhodium, and iridium, a support consisting in major amount one or more suitable zeolites and in minor amount an inorganic refractory oxide chosen from the group consisting of oxides of aluminum, titanium, tin, zirconium, and mixtures thereof. The catalyst is optionally heat-treated before use.

The present invention also provides a process for reducing the levels of particulate matter, hydrocarbons, carbon monoxide, and nitrogen oxides in the exhaust gas of a diesel engine which comprises contacting the exhaust gas under appropriate conversion conditions with a catalyst comprising an effective amount of a noble metal selected from the group consisting of platinum, palladium, rhodium, and iridium, and mixtures thereof, on a two-part support consisting of a major amount of a suitable zeolite and a minor amount of a refractory metal oxide selected from the group consisting of oxides of aluminum, titanium, tin, zirconium, and mixtures thereof.

DETAILED DESCRIPTION OF THE INVENTION

The finished adsorbent catalyst of this invention will typically contain about 0.005 wt. % to about 1.0 wt. % noble metal, preferably about 0.015 wt. % to about 0.35 wt. %, based on the total weight of the catalyst. The support of zeolite and an inorganic refractory metal oxide will contain about 2 wt. % to about 21 wt. % zeolite based on the total weight of the catalyst, preferably about 8 wt. % to about 17 wt. %. Where the metal oxide is alumina or a mixture of alumina and either titania or zirconia, the support will contain about 1 wt. % to about 11 wt. % alumina based upon the total weight of the catalyst, preferably about 2 wt. % to about 4 wt. %. Where the metal oxide is titania or a mixture of titania and alumina, the support will contain about 1 wt. % to about 23 wt. % titania based upon the total weight of the catalyst, preferably about 2 wt. % to about 15 wt. %. Mixed metal oxides in which one metal is "doped" with a minor portion of another, for example zirconium oxide in which a minor amount of cerium is included in the crystalline matrix, may also be used as supports.

Zeolites. The zeolites suitable for use in the support of this invention are those which are capable of trapping the typical hydrocarbons that are included in diesel exhaust at low temperatures (below about 150° C. to 250° C.) and releasing those hydrocarbons at higher temperatures where they will oxidize more readily. In particular, the zeolite should be characterized in that it maintains crystalline structure over extended operation at temperatures in the range of 750° C. to 850° C. in air, has an average pore size of greater than about 0.6 nm, and a Si/Al ratio of greater than about 5. Examples of suitable zeolites are beta zeolite, ultra-stable Y zeolite and UTD-1 zeolite, in the hydrogen ion (low sodium ion) form of the zeolite, with beta and Y being preferred.

In one preferred embodiment, the support may contain more than one type of zeolite material. For example, a blend of beta and Y zeolites may be used, or the support may contain two or more zeolites, each having a different range of pore sizes. Thus, a preferred large pore zeolite having pores in the range of from about 0.6 nm to about 1.1 nm (about 6Å to about 11 Å) used to accommodate the larger hydrocarbon molecules contained in diesel exhaust may be combined with a minor amount of a zeolite having pores in the range of from about 0.23 nm to about 0.6 nm (about 2.3 Å to about 6 Å) and a Si/Al ratio between about 5 and 50.

Inorganic Oxides. The inorganic oxide portion of the support primarily functions to improve adhesion of the zeolite to a carrier substrate in a washcoat process or as a binder for catalysts formed without a carrier substrate. In addition, alumina will aid in the oxidation of carbon monoxide, while titania will help reduce the conversion of $SO_2$ to $SO_3$. Both alumina and titania tend to also promote the oxidation of hydrocarbons. The alumina may be in the gamma, delta, or theta forms. The titania is preferably in the anatase phase.

Substrate. The catalyst may be in pelleted form or, more preferably, in the form of a support which is washcoated on a carrier substrate such as a flow through honeycomb monolith made of ceramics or metal, as will be familiar to those skilled in the art.

Noble metals. The noble metal or metals will be deposited onto the support powder either before or after it is slurried in water and applied to the monolith by methods known to the art. The same technique could be applied to a pelleted catalyst. The noble metal or metals are applied to the support by decomposing a noble metal compound which has been deposited on the support. Where there is more than one noble metal, the noble metals may be applied either separately or in combination by techniques familiar to those skilled in the art. Preferred catalysts contain palladium only or a combination of platinum and palladium.

Examples of suitable noble metal compounds are: tetraamine platinum hydroxide, platinum nitrate, platinum sulfite, platinum dicarbonyl dichloride, dinitrodiamino platinum, palladium nitrate, diamminepalladium hydroxide, tetraamminepalladium chloride, palladium citrate, rhodium trichloride, hexaamminerhodium chloride, rhodium carbonylchloride, rhodium trichloride hydrate, rhodium nitrate, hexachloroiridate (IV) acid, hexachloroiridate (III) acid, dichlorodhydroiridate (III) acid, ammonium hexachloroiridate (III) acid, ammonium aquohexachloroiridate (IV), tetraammine-dichloroiridate (III) chloride, tetraamminedichloroiridate (III) chloride. Preferred compounds are platinum sulfite, palladium nitrate and rhodium nitrate.

Heat Treatment. The optional heat treatment procedure is carried out by heating the catalyst in a gas stream containing from 0% to about 2% water, about 0% to about 21% oxygen, with a balance of nitrogen. Preferably the treatment is carried out in pure nitrogen. The temperature is increased to above 650° C. at a slow rate to avoid thermally stressing the ceramic monoliths. The preferred temperature is 750° C. The temperature is then maintained for a period of from about 1 to about 24 hours, preferably for about 4 hours. The catalysts are then cooled at a sufficiently slow rate to avoid thermal stresses in the ceramic. The up and down ramp rates depend on oven geometry, and must ensure that the thermal gradient in the ceramic does not exceed 87° C. per linear centimeter (400° F. per linear inch) at any place in the ceramic.

The following examples will demonstrate that the catalyst of the instant invention yields increased conversion of the hydrocarbon, the soluble organic fraction, and the carbon monoxide from a diesel exhaust stream, as well as decreased oxidation of $SO_2$.

EXAMPLE I

Preparation of Inventive Catalysts

Catalyst A. A catalyst of the instant invention was prepared by making a Condea Puralox SCCa delta alumina slurry using standard techniques (milling the alumina to approximately 5 micron average particle size and adjusting the pH to a value in the range of from about 3.2 to 3.8 using nitric acid). The slurry was then mixed with a hydrogen ion form of beta-zeolite having a Si/Al ratio of 15 to give a mixture having a ratio of 20 parts by weight of beta-zeolite to 3 parts by weight of alumina powder. The mixture was then adjusted with water to provide the desired coating concentration and coated on a ceramic monolith. The coated monolith was calcined at 600° C. for about 1 hour. The calcined monolith was then impregnated with platinum sulfite and again calcined at 600° C. for 1 hour.

One sample of Catalyst A was then heat-treated by heating in a gas stream containing about 0.2% water and about 21% oxygen, with a balance of nitrogen. The temperature was increased at a slow rate to avoid thermally stressing the ceramic monoliths up to a temperature of 700° C. The temperature was then maintained for about 6.5 hours. The catalyst was then cooled at a sufficiently slow rate to avoid thermal stresses in the ceramic. The finished Catalyst A (both heat-treated and non-heat-treated) contained nominal loadings of 0.35 g/L Pt, 0.014 g/cm$^3$ alumina, and 0.092 g/cm$^3$ zeolite.

Catalyst D. A catalyst of the instant invention was prepared by making an alumina slurry using standard techniques (milling the alumina to approximately 5 micron average particle size and adjusting the pH to a value in the range of from about 3.2 to 3.8 using nitric acid). The slurry was then mixed with an ultra-stable Y-zeolite having a Si/Al ratio of 8.5 to give a mixture having a ratio of 20 parts by weight of Y-zeolite to 3 parts by weight of alumina powder. The mixture was then adjusted with water to provide the desired coating concentration and washcoated on a ceramic monolith. The coated monolith was calcined at 600° C. for about 1 hour. The calcined monolith was then impregnated with platinum sulfite and again calcined at 600° C. for 1 hour.

One sample of Catalyst D was then heat-treated by heating in a gas stream containing about 0.2% water and about 21% oxygen, with a balance of nitrogen. The temperature was increased up to a temperature of 700° C., at a slow rate to avoid thermally stressing the ceramic monoliths. The temperature was maintained at that temperature for about 6.5 hours. The catalyst was then cooled at a sufficiently slow rate to avoid thermal stresses in the ceramic. The finished catalyst contained nominal loadings of 0.35 g/L Pt, 0.015 g/cm$^3$ alumina, and 0.096 g/cm$^3$ Y-zeolite.

Catalyst G. A catalyst of the instant invention was prepared in the same manner as was Catalyst D, except that titania was used instead of alumina, and a mixture of platinum and palladium was used instead of only platinum. The finished catalyst contained nominal loadings of 0.35 g/L Pt, 0.18 g/L Pd, 0.015 g/cm$^3$ titania, and 0.096 g/cm$^3$ zeolite.

Catalyst I. A catalyst of the instant invention was prepared in the same manner as was Catalyst D, except that a mixture of platinum and vanadium was used instead of only platinum. After drying and calcination, the monolith was coated with a homogeneous mixture of platinum nitrate, ammonium metavanadate, and oxalic acid. The finished catalyst contained nominal loadings of 0.35 g/L Pt, 0.18 g/L V, 0.015 g/cm$^3$ alumina, and 0.096 g/cm$^3$ zeolite.

Catalyst J. A catalyst of the instant invention was prepared in the same manner as was Catalyst I, except that the finished catalyst contained nominal loadings of 0.177 g/L Pt, 2.12 g/L V, 0.015 g/cm$^3$ alumina and 0.06 g/cm$^3$ zeolite.

EXAMPLE II

Preparation of Comparative Catalysts

Catalyst B. A catalyst was prepared in the same manner as was Catalyst A except that a silica-alumina (Condea Siral 90 HT; Si/Al=7.6) was used instead of beta zeolite and the nominal loading of platinum was approximately five times that of Catalyst A. The catalyst was not heat-treated. The finished catalyst contained nominal loadings of 1.85 g/L Pt, 0.018 g/cm$^3$ alumina, and 0.043 g/cm$^3$ silica-alumina Catalyst W. A commercial catalyst having approximately 50 g/ft$^3$ Pt and containing vanadium, titania, and alumina was used as a comparative catalyst.

Catalyst X. A comparative catalyst was prepared by mixing a hydrogen ion form of beta-zeolite having a silica/alumina ratio of 15 with water to prepare a slurry and then coating the slurry on a ceramic monolith. The coated monolith was calcined at 600° C. for one hour. The calcined monolith was then impregnated with platinum sulfite. The finished catalyst contained nominal loadings of 0.35 g/L Pt and 0.18 g/cm³ zeolite.

Catalyst Y. A comparative catalyst was prepared in the same manner as was Catalyst X except that the nominal loading of platinum was approximately four times that of Catalyst A or 1.48 g/L Pt.

Catalyst Z. A comparative catalyst was prepared by mixing 4000 grams gamma alumina (surface area 2100 m²/g) with 3730 g water ad 216 grams nitric acid. The slurry was milled to a particle size of 5 microns, and washcoated on a monolith. The coated monolith was calcined for one hour at 600° C., and impregnated with platinum sulfite. The finished catalyst contained nominal loadings of 0.104 g/cm³ alumina and 1.77 g/L Pt.

EXAMPLE III

The conversion efficiency for inventive Catalysts D, I and J and comparative Catalysts W, and Z were compared by testing them on a diesel passenger car having a 1.9 L non-turbo, indirect injection diesel engine using the European procedures for testing catalysts: the UDC ("Urban Driving Cycle") and the EUDC ("Extra-urban Driving Cycle"). Results appear in Tables 1–3.

TABLE 1

Vehicle Testing (Fresh Catalysts)

| Catalyst | CO g/km | HC g/km | NO$_x$ g/km | P.M. g/km | Pt g/L |
|---|---|---|---|---|---|
| None | 0.55 | 0.12 | 0.63 | 0.065 | — |
| D | 0.35 | 0.045 | 0.61 | 0.034 | 0.35 |
| Z | 0.21 | 0.06 | 0.60 | 0.032 | 1.77 |
| W | 0.33 | 0.07 | 0.64 | 0.031 | 1.77 |

TABLE 2

Aging Results

| | Engine Out Emissions | Catalyst I Fresh | Catalyst I Aged 854 Hrs. | Catalyst W Fresh | Catalyst W Aged 900 Hrs. |
|---|---|---|---|---|---|
| Parameter | g/km | g/km | g/km | g/km | g/km |
| Pt (g/L) | — | 0.35 | 0.35 | 1.77 | 1.77 |
| CO | 0.55 | 0.27 | 0.37 | 0.17 | 0.33 |
| HC | 0.125 | 0.03 | 0.046 | 0.03 | 0.053 |
| NO$_x$ | 0.63 | 0.65 | 0.66 | 0.71 | 0.66 |
| PM | 0.065 | 0.026 | 0.027 | 0.031 | 0.026 |

TABLE 3

Aging Results

| | Engine Out Emissions | Catalyst J Fresh | Catalyst J Aged 400 hrs. | Catalyst W Fresh | Catalyst W Aged 400 Hr. |
|---|---|---|---|---|---|
| Parameter | g/km | g/km | g/km | g/km | g/km |
| Pt (g/L) | — | 0.177 | 0.177 | 1.77 | 1.77 |
| CO | 0.55 | 0.22 | 0.43 | 0.17 | 0.34 |
| HC | 0.125 | 0.03 | 0.063 | 0.03 | 0.065 |
| NO$_x$ | 0.63 | 0.71 | 0.66 | 0.71 | 0.65 |
| PM | 0.065 | 0.036 | 0.026 | 0.031 | 0.026 |

The vehicle testing results in Tables 1, 2, and 3 show the efficacy of the zeolite approach. With the low noble metal loadings, the inventive catalysts are as efficient at removing the hydrocarbon as the higher loaded reference catalysts. These results demonstrate that very low levels of platinum are required to achieve acceptable hydrocarbon reduction in the exhaust stream. The removal of carbon monoxide is much more sensitive to the platinum content of the catalyst, as the zeolite does not adsorb the carbon monoxide.

A major concern about catalysts with reduced amounts of platinum is the durability in actual practice. After 400 hours of aging on a diesel engine, Catalyst J has hydrocarbon and particulate conversion efficiency equivalent to Catalyst W, with some loss of carbon monoxide conversion efficiency. The comparative catalyst shows a smaller loss of carbon monoxide conversion efficiency. Taken together, this demonstrates acceptable durability for Catalyst J. Catalyst I, with a reduced amount of platinum, also shows equivalent hydrocarbon and particulate conversion efficiency after 854 hours, with some loss in carbon monoxide conversion efficiency. Here the comparative catalyst shows an equivalent loss in carbon monoxide conversion efficiency.

Most of the hydrocarbons in the exhaust stream of the diesel engine adsorb to a higher temperature than decane, or the catalyst oxidizes them at a lower temperature than decane, or both. We have now provided a catalytic material that combines both a HC adsorbent and a catalyst material onto the same substrate. They may even be the same powder (for instance, a preimpregnated Pt/molecular sieve where the Pt oxidation function and the molecular sieve HC adsorption function are combined in the same powder).

EXAMPLE IV

A series of catalysts were made (according to the procedure of Example I for catalyst A) as follows:

TABLE 4

| Catalyst | Pt content | Washcoat | 50% conversion |
|---|---|---|---|
| A-1 | 1 g/ft³ | Zeolite Beta, Al—AT | 320° C. |
| A-2 | 2.5 g/ft³ | Zeolite Beta, Al—AT | 280° C. |
| A-3 | 5 g/ft³ | Zeolite Beta, Al—AT | 245° C. |
| A-4 | 20 g/ft³ | Zeolite Beta, Al—AT | 235° C. |
| A-5 | 40 g/ft³ | Zeolite Beta, Al—AT | 225° C. |

The washcoat loading was held constant and Pt sulfite was always the Pt source. The catalysts were tested for decane conversion using the method of Example III. The results show high levels of decane conversion at low temperatures. This is attributed to adsorption. At temperatures between about 210°–225° C., depending on the Pt loading, decane conversion declines. For catalysts with Pt contents of 20 g/ft³ or less, the measured decane conversion reaches zero. In these experiments, decane conversion is determined by a flame ionization detector. The associated software normalizes detected inlet decane concentrations that are greater than the expected inlet (a.k.a. bypass) decane concentration. That is, negative conversion levels are normalized to 0% conversion.

As the noble metal content of the catalyst is increased, the activity of the catalyst for catalytic oxidation increases. The temperatures for 50% conversion levels as a function of Pt content are shown in Table 4.

The catalyst containing 40 g/ft³ Pt shows adsorption of decane at low temperatures, a decline in apparent decane conversion to a minimum of about 20% conversion at about 220° C., followed by increased decane conversion, presumably due to catalytic oxidation.

As the art is aware, the observed decline in low temperature decane conversion will most likely be due to one of two reasons and experience will determine which is the more probable. Those reasons are:

the adsorption capacity of the zeolite is attained, so there's no more "room" for additional adsorption, or the temperature of decane desorption has been attained.

As the average molecular weights of the gaseous hydrocarbons and the SOF (SOF=soluble hydrocarbon fraction in the particulate matter) in diesel exhaust increases, the average desorption temperature will also increase. These parameters will be a function of engine technology. Thus, the specific amount of Pt sufficient to result in effective catalytic oxidation light off at temperatures lower than the desorption temperatures will also be a function of engine technology, and will have to be determined with minimal experimentation, as will be expected by those skilled in this art.

We claim:

1. In the process for treating motor vehicle diesel exhaust gas to remove carbon monoxide, hydrocarbons and nitrogen oxides and to minimize the production of sulfur trioxide comprising contacting said exhaust gas under conversion conditions with an effective amount of a catalyst material, the improvement wherein said catalyst material consists essentially of:

(a) a noble metal selected from the group consisting of Pt, Pt mixed with Pd, Pt mixed with Rh, Pt mixed with Ir, and Pt mixed with V, said noble metal constituting about 0.005 wt % to about 1.0 wt % of the total catalyst weight; said noble metal being dispersed on:

(b) a support having a minor component and a remainder component, said minor component consisting essentially of a metal oxide selected from the group consisting of alumina, titania, and mixtures thereof, said remainder component consisting of a zeolite chosen from the group consisting of beta zeolite, Y zeolite, and mixtures thereof, wherein said zeolite is in the hydrogen ion form and not metal-doped, maintains stable crystalline pore structures at temperatures up to 850° C. in air, and has an average pore size greater than about 6.5 Å thereby being capable of adsorbing at temperatures below about 250° C. hydrocarbons contained in the soluble oil fraction of diesel exhaust gas and of releasing said hydrocarbons at temperatures above 250° C.

2. The process of claim 1 wherein the catalyst material is washcoated on a substrate selected from the group consisting of ceramic monoliths and metallic monoliths.

3. The process of claim 1 wherein the catalyst material contains 0.015 to 0.35 wt. percent of platinum, palladium or a mixture thereof, 8 to 17 wt. percent of zeolite and 2 to 4 wt. percent of alumina.

* * * * *